United States Patent [19]

LeGrand et al.

[11] E Re. 31,000

[45] Reissued Jul. 27, 1982

[54] METHOD AND APPARATUS FOR REFORMING AND STRAIGHTENING VEHICLES

[75] Inventors: Pierre N. LeGrand, Soumagne, Belgium; Dirk J. van Dalen, Palm Beach, Fla.

[73] Assignee: Applied Power, Milwaukee, Wis.

[21] Appl. No.: 242,056

[22] Filed: Apr. 3, 1981

Related U.S. Patent Documents

Reissue of:

[64] Patent No.: 4,193,203
Issued: Mar. 18, 1980
Appl. No.: 896,186
Filed: Apr. 14, 1978

U.S. Applications:

[62] Division of Ser. No. 831,508, Sep. 8, 1977, Pat. No. 4,174,673.

[51] Int. Cl.[3] ..... B21D 1/14; G01B 5/24

[52] U.S. Cl. ..... 33/180 AT; 33/288

[58] Field of Search ..... 33/180 AT, 288, 181 AT; 72/705, 32

[56] References Cited

U.S. PATENT DOCUMENTS 4,055,061 10/1977 Bayorgeon et al. ..... 33/288

*Primary Examiner*—Willis Little
*Attorney, Agent, or Firm*—Fred Wiviott

[57] ABSTRACT

A measuring bridge coupled to a vehicle by means of a plurality of vertical elements attached to datum points on undamaged portions of the vehicle to properly orient it to the vehicle. In addition, vertical measuring elements attached to datum points in damaged portions of a vehicle are supported on the bridge for movement in two perpendicular directions and a plane parallel to the vehicle and extend along their length to follow and monitor the reforming of the vehicle during the application of force. The measuring bridge is supported by a plurality of air pressure cylinders to maintain proper orientation of the bridge with respect to the vehicle.

11 Claims, 19 Drawing Figures

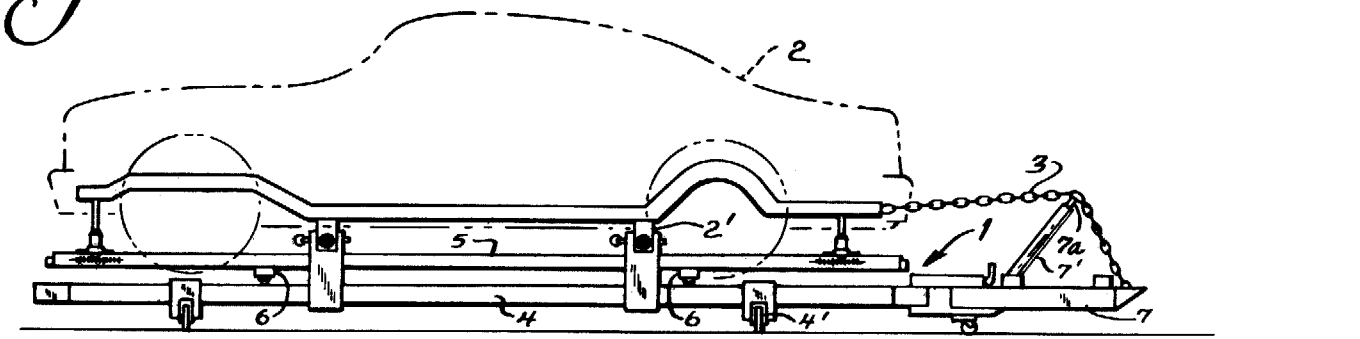
Fig. 1
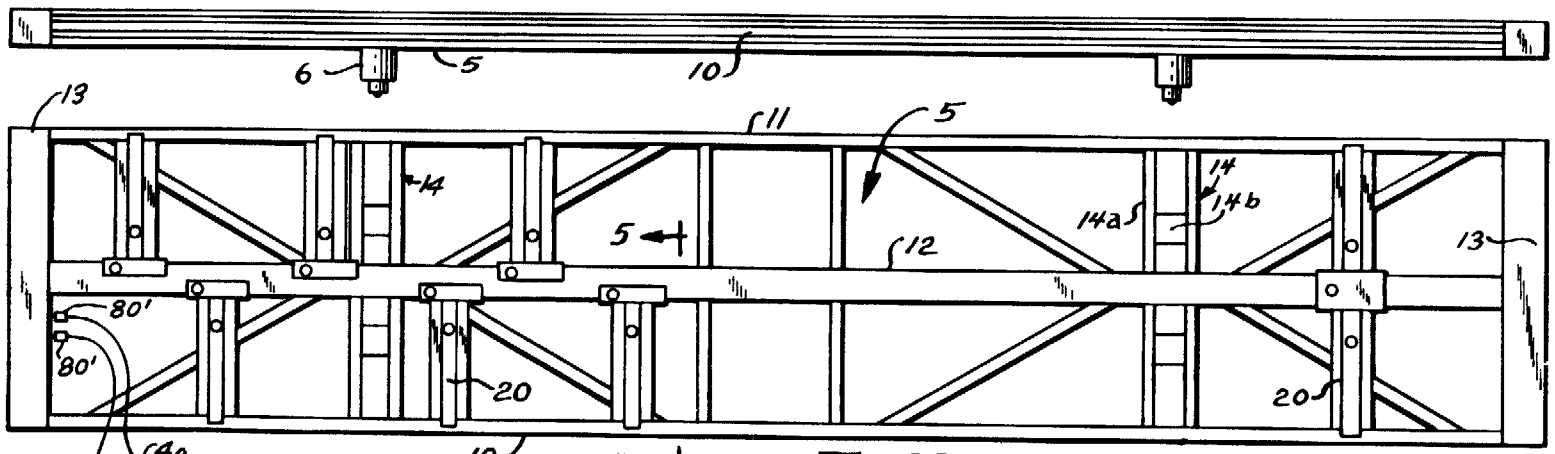
Fig. 4
Fig. 2

Fig. 16
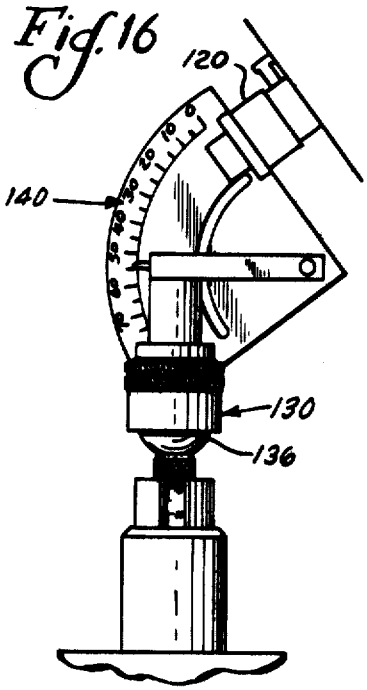
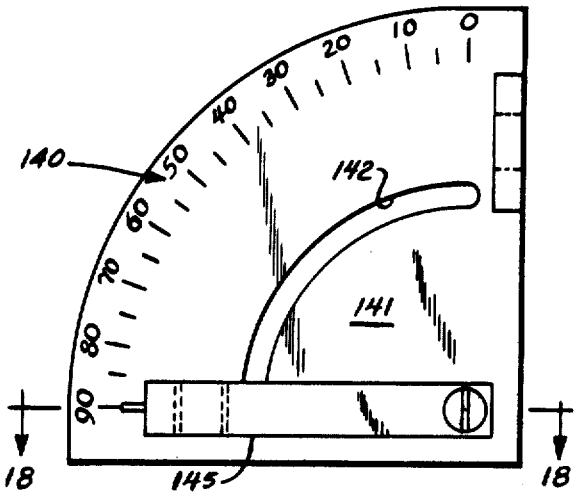
Fig. 17
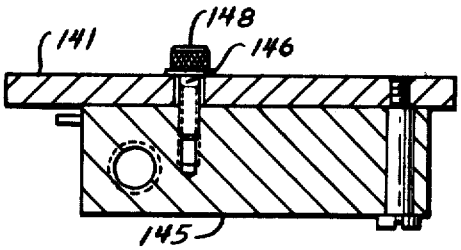
Fig. 18
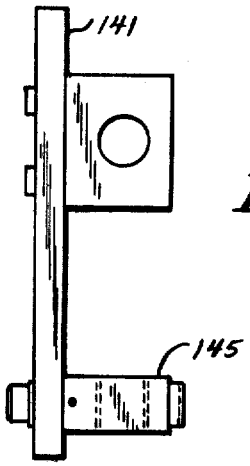
Fig. 19

METHOD AND APPARATUS FOR REFORMING AND STRAIGHTENING VEHICLES

Matter enclosed in heavy brackets [ ] appears in the original patent but forms no part of this reissue specification; matter printed in italics indicates the additions made by reissue.

This is a division, of application Ser. No. 831,508 filed Sept. 8, 1977 *now U.S. Pat. No. 4,174,673.*

BACKGROUND OF THE INVENTION

This invention relates in general to force applying devices and methods and in particular, to an improved measuring bridge for use in an apparatus for straightening and reforming vehicle bodies and frames.

More specifically, the invention relates to an apparatus for straightening reformed vehicle bodies, frames and other parts of damaged or misaligned vehicles wherein a measuring bridge of the apparatus is positioned in coupling relationship to a vehicle to be straightened. The measuring bridge is oriented for use by a plurality of vertical elements which are adapted to be secured to a plurality of datum locations positioned in undamaged portions the vehicle body. The measuring bridge is maintained in proper orientation by restraining the plurality of vertical elements from movement relative to the measuring bridge.

In addition, other vertical elements are attached to datum points in damaged portions of the vehicle whereby the base of each vertical element is movable in two perpendicular directions laterally and longitudinally of the vehicle and the vertical element is also vertically extendible. The initial position of each datum point and its progress to a proper position to attain symmetry of the vehicle is continuously measured. The measuring bridge is maintained in proper vertical position relative to the vehicle by air cylinder means which biases it against the vehicle by a predetermined force.

Reference is specifically made to the co-pending application of Bayorgeon, et al., Ser. No. 680,146, filed Apr. 26, 1976 for an Apparatus for Reforming and Straightening Vehicles in which there is disclosed an improved apparatus for straightening vehicles. Although the apparatus disclosed in the co-pending application produces significantly improved straightening accuracy over the prior art devices, the apparatus disclosed therein does not achieve an optimum degree of accurate orientation and reference to a vehicle to ensure maximum results when performing a straightening or reforming operation upon a vehicle body.

The achievement of optimum orientation of the measuring bridge of a straightener insures that the bridge is accurately situated relative to the vehicle body so that the reforming operation can be performed to achieve a degree of accuracy in realignment, reforming and straightening not heretofore possible.

In the straightener of the type disclosed in co-pending application, Ser. No. 680,146 now U.S. Pat. No. 4,055,061, a unique measuring bridge is utilized in which vertical elements are attached to datum points of a vehicle and the vertical elements are freely movably on the measuring bridge laterally and longitudinally and are vertically extensible whereby reforming operations may be performed on the vehicle and the vertical members continuously indicate whether datum points on the vehicle to which the elements are connected have returned to their proper position in accordance with the symmetry of the vehicle being straightened. Such an improved straightener provides a continuous and accurate three dimensional indication as to whether the datum points have returned to target positions which are unique in each model vehicle indicating that a proper corrective reformation of the vehicle has been achieved.

To improve the unique technique of straightening and reforming vehicles as described in the previously mentioned co-pending application, it is desirable to maximize the accuracy of the referencing and orientation of the measuring bridge relative to the vehicle initially and during the application of force to provide the greatest possible results.

SUMMARY OF THE INVENTION

It is, therefore, an object of this invention to improve the apparatus for straightening and reforming vehicle bodies and frames.

A further object of this invention is to couple a measuring bridge to the vehicle during a reforming and straightening operation to indicate the progress thereof.

Still another object of the invention is to maintain proper orientation of the measuring bridge withh respect to the vehicle during a straightening operation to ensure optimumly accurate results.

A still further object of the invention is to reduce the still required for an operator to perform a reforming operation of a vehicle damaged in collision and the like.

Still another object of the invention is to improve the attachment of the measuring bridge to a vehicle.

These and other objects are attained in accordance with the present invention wherein there is provided an improved apparatus for applying a force to a vehicle to straighten its frame or body after being deformed in a collision or other mishap. In general, the vehicle to be straightened is positioned over the apparatus of the invention whereby a frame supports one or more hydraulic rams which when actuated extends to apply a force to a flexible force transmitting element attached to a portion of the vehicle and retained at its other end to a securement point. The frame of the invention is attached to the body of the vehicle at a plurality of points by means of sleeve or clamp mechanisms to secure the straightening apparatus in relation to the vehicle.

The frame further supports an improved measuring bridge which includes a plurality of vertical reference and indicating elements adapted to be coupled to datum points on the vehicle. The indicating elements are capable of being telescopically extendable in a vertical direction and indicate vertical measurements of reference points on the vehicle body relative to the horizontal plane. The vertical indicating elements are supported on suitable means coupled to the measuring bridge for free movement in directions longitudinally and laterally of the vehicle body in a parallel plane. Thus, as a force is applied to a vehicle, the movement of datum points on the vehicle body and frame in three perpendicular dimensions, vertically, horizontally and laterally relative to respective measuring scales, is continuously followed. The initial deviation of the datum points in damaged portions of the vehicle is at a glance determinable by use of the associated linear measuring scales.

The movement of each of the plurality of vertical indicator elements of the invention is independent of each other whether in a longitudinal, lateral or vertical direction. Such independent support of the adaptors on either side of the longitudinal center line of the vehicle is an important aspect since in normal or damaged conditions, a vehicle is symmetrically designed by a manufacturer with respect to its center line.

In order to properly reference the measuring bridge to accomplish the foregoing function, the apparatus of the application possesses vertical reference elements attachable at three or more datum points in the undamaged portions of the vehicles. Since undamaged datum points are located in the proper position on the vehicle, the vertical members attached to undamaged portions are then restrained from movement longitudinally or laterally and are of a predetermined fixed length depending on the vehicle make and the location of the datums. Thus, the measuring bridge is coupled to properly positioned datum points by means of the fixed vertical members whereby the measuring bridge in turn is in proper reference to the vehicle. When other vertical members, movable in the manner previously described, are attached to datum points in damaged portions a reforming operation can be performed until such time as the vertical indicator element attached to the damaged portions reach the so-called target points indicating symmetry of the vehicle.

The invention of the application includes an improved means for supporting the measuring bridge vertically by which a plurality of cylinders pressurized by a source of fluid pressure bias the vertical adaptors in the undamaged portions against the datum points by predetermined bias force. Thus, the measuring bridge is easily positionable relative to the vehicle prior to straightening and is maintained in proper orientation even during the application of force to reform the vehicle. In addition, the vertical elements used both for attachment to points in damaged portions and undamaged portions of vehicle have been vastly improved to permit attachment to various elements and locations on the vehicle datum points such as formed by holes in the vehicle body, bolt heads or other elements on the vehicle, even when the points lie on angularly disposed planes.

BRIEF DESCRIPTION OF THE DRAWINGS

Further objects of the invention together with additional features contributing thereto and advantages accuring therefrom, will be apparent from the following description of an embodiment of the invention when read in conjunction with the accompanying drawings, wherein:

FIG. 1 is a side schematic illustration of the vehicle body and frame straightening invention in operative connection to a vehicle to be straightened;

FIG. 2 is a top schematic illustration of the measuring bridge of the apparatus shown in FIG. 1;

FIG. 4 is a side schematic illustration of the entire measuring bridge of the invention;

FIG. 16 is a side schematic illustration of a third embodiment of the vertical slide assembly for use with the measuring bridge of the invention;

FIG. 17 is a front schematic illustration of the protractor as shown in FIG. 16;

FIG. 18 is a top schematic illustration of the protractor of FIG. 17; and FIG. 19 is an end schematic illustration of the protractor of FIG. 17.

DESCRIPTION OF THE PREFERRED EMBODIMENT

Figure 3:
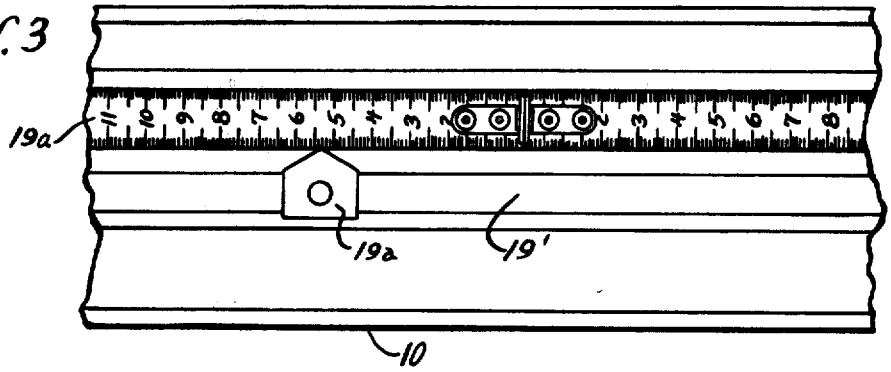
FIG. 3 is a partial side schematic illustration of the measuring bridge of the invention showing the indicating scale.

Referring to FIG. 1 there is illustrated an embodiment of the vehicle body and frame straightener apparatus of the invention in operative connection to a vehicle for a straightening operation of its frame or body. The vehicle body and frame straightener apparatus 1 may be connected to a vehicle 2 (shown in phantom) which is attached to straightener 1 by suitable clamp means 2'. Straightener 1 applies a force to the vehicle, which may be elevated, through means of an elongated flexible force transmitting element 3 such as a chain or other suitable element.

The straightener 1 includes a frame 4 which rests on a support surface by a plurality of caster roller assemblies 4' which can be located at any position on frame 4 and may comprise any number such as four assemblies. Frame 4 supports a measuring bridge 5 of the invention which is operably coupled to the vehicle during a force applying operation.

Frame 4 possesses a plurality of cross members (not shown) upon which a plurality of pneumatic pressure cylinders 6 bear against, and the cylinders extend from the underside of measuring bridge 5. The structure and function of pneumatic cylinders 6 will be explained in detail later. A force is applied to the vehicle through force transmitting element 3 by means of a respective removable force applying arm 7 which can be located at any position circumferentially around the frame for selected directional force application. The force applying means can include a pivotally mounted ram 7' having an extensible end 7a in contact with force transmitting means 3 such as, for example, disclosed in said co-pending application, Ser. No. 680,146.

In FIG. 1 there is shown a single force applying arm 7 being utilized in conjunction with the invention, but any number of force applying arms can be utilized simultaneously or sequentially depending on encountered conditions in the vehicle. As is apparent from FIG. 1, force applying arm 7 may be attached to the frame in front, back or adjacent to each side and corner of the vehicle as desired.

As best shown in FIGS. 2, 4, 5, 6, 7, 8, 10 and 11, measuring bridge 5 comprises a pair of outside elongated track members 10 and 11 aligned in parallel relationship to each other. A middle track member 12 is situated in parallel relationship between tracks 10 and 11. The tracks are maintained in parallel relationship by means of two end braces 13 and a plurality of intermediate braces 14 which are attached by any convenient technique to the undersurface of tracks 10, 11 and 12 and include a pair of spaced beams 14a having respective plates 14b.

Figure 10:
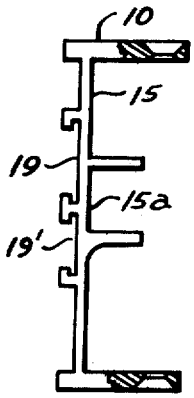
FIG. 10 is an end view of one of the side longitudinal tracks of the measuring bridge of the invention.
Figure 11:
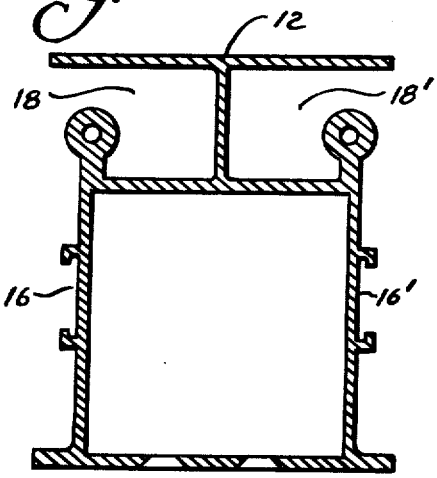
FIG. 11 is a sectional illustration of the middle longitudinal track of the measuring bridge of the invention.
Figures 5, 6, 7, 8:
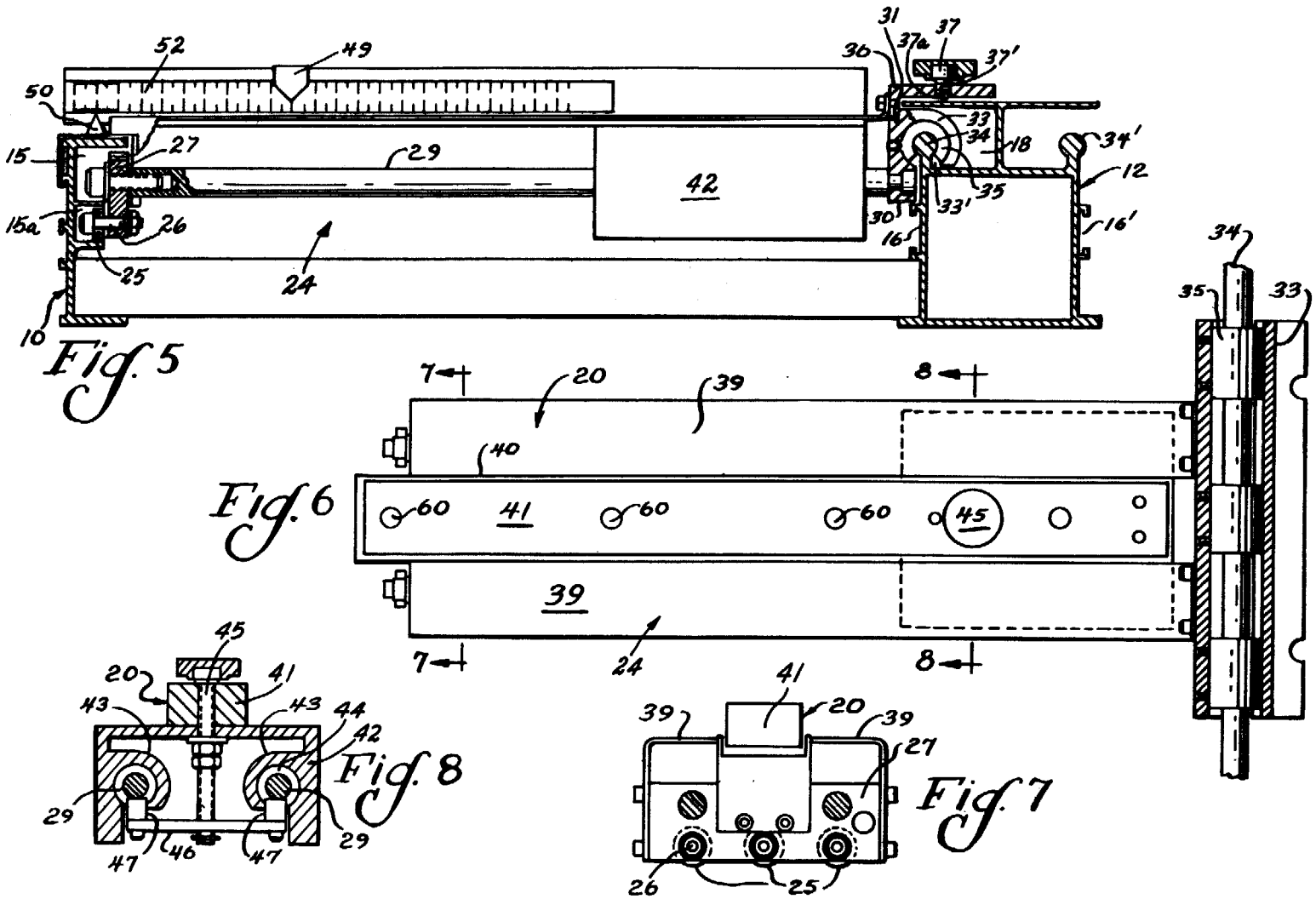
FIG. 5 is a partial sectional illustration of a lateral member of the invention taken along lines 5—5 of FIG. 2.
FIG. 6 is a top sectional illustration with parts in section showing a lateral member of the measuring bridge.
FIG. 7 is a sectional illustration of a lateral cross-member of the measuring bridge taken along lines 7—7 of FIG. 6.
FIG. 8 is an additional sectional illustration of the cross member showing the lateral retention means taken along lines 8—8 of FIG. 6.

Referring to FIGS. 5, 10 and 11, the cross sectional configuration of track 10 and center track 12 is illustrated. In regard to the cross sectional configuration of track 11, it should be noted that it is correspondingly opposite cross track 10. A pair of longitudinal slots 15 and 15a are formed in the inner side surface of track 10. In middle track 12 a longitudinal slot 16 and 16' is formed on each side and a pair of adjacent track compartments 18 and 18' are provided above the upper projection of slot 16 and 16', respectively. A series of lateral slide assemblies 20 which span the separation between track 10 or track 11 and the center track are mounted on a respective track 10 or 11 and center track 12 for longitudinal motion along the measuring bridge on each side of center track 12. Any number of cross slide assemblies 20 can be utilized in conjunction with the measuring bridge of the invention dependent on the encountered condition.

It should be apparent that the movement of the cross slide assemblies 20 between track 10 and center track 12 is totally independent of the movement of assemblies between tracks 11 and center track 12 except for the rearmost assembly. In FIG. 2 six such independent slide assemblies are shown for purposes of illustration.

As best shown in FIGS. 3, 5 and 10 tracks 10 and 11 each include a slot 19 on their upper outside surface which receives a linear scale 19a indicating dimensions along the longitudinal track from a reference point. A second lower outside slot 19' is provided in both tracks 10 and 11 to receive a target indicator 19a which can be adjustably secured in the slot to indicate target longitudinal dimensions of a vehicle model as will be explained in detail later.

Referring to FIGS. 5, 6, 7 and 8, the construction of one of the cross side assemblies 20 is clearly illustrated. Cross slide members 20 are carried between either side track 10 or 11 and the center track by means of a carriage 24. Carriage 24 is supported on either outside track 10 or 11 for longitudinal movement thereon by means of a plurality of rollers 25 such as three as shown in FIG. 7. Rollers 25 are designed to ride in the slot 15a wherein the two outside rollers viewing FIG. 7 bear against the bottom surface of the slot and the center roller rides and bears against the upper surface (not shown). The rollers are mounted for rotary movement upon a respective shaft 26 which extends through a plate 27.

Plate 27 receives a pair of elongated rods 29 which span the lateral distance between either of the side tracks and the center track 12 in parallel relationship. The inner end of rods 29 are supported at center track 12 by means of holes 30 provided in a slide mounting assembly 31 movable relative to center track slide compartment 18 or 18'. Mounting assembly 31 is in the form of a sleeve having an open tubular channel 33 with an open bottom 33' whereby channel 33 embraces a longitudinal lobe 34 or 34' having a cylindrical circular cross section situated in slide compartment 18 or 18' to permit the sleeve member to slide longitudinally along the center track. A series of ball bushings 35 are attached to the interior of channel 33 to reduce friction between lobe 34 and the mounting assembly. The upper portion of mounting assembly 33 possesses a horizontal cover plate 36 disposed in spaced relationship to track 12. A threaded thumb screw or shaft 37 extends through a hole 37' in cover plate 36. As is clear in FIG. 5, the thumb screw may be tightened in a manner that its conical end 37a frictionally contacts the upper surface of track 12 to permit selective retention of the slide member 20 against longitudinal movement for reasons to be explained in detail later.

As is clearly shown in FIGS. 6 and 7, the slide assembly is practically enclosed on its upper surface by means of a pair of housings 39 which are attached by suitable means to plate 27 and mounting 31 whereby the housings form an upper slide receiving opening 40 having a slide member 41 which is capable of lateral movement relative to the carriage 24. As best shown in FIGS. 6 and 8, slide 41 is attached to a lateral carriage 42 having a pair of downwardly opening tubular channels 43 to embrace rods 29 for relative movement thereon. Ball bushings 44 are imposed between channels 43 and rods 29 to reduce friction therebetween.

Referring to FIG. 8, a threaded shaft 45 which manually can be rotated extends through slide 41 and downward into carriage 42 to engage a plate 46 having an opening to receive the shaft. Plate 46 supports a pair of upward projections 47 which are mounted for movement into channels 43 when shaft 45 is tightened to engage rods 29 and retain slide 41 against lateral movement on the rods. In a loosened condition of shaft 45, slide 41 may freely move laterally of the measuring bridge.

Each slide 41 may carry on its upper surface one or more adjustable indicator plates 49 which possess an apex to act as a target indicator line as best shown in FIG. 5. In addition, an indicator 50 is positioned on track 10 with each slide assembly adjacent to scale 52 and acts a fixed reference indicia. It should be apparent that as slide 41 is moved in a lateral direction, the indicator plate 49 is carried therealong as an indication of the progress of straightening until a lateral target dimension is reached.

The upper surface of slides 41 possess a series of openings 60 respectively which are adapted to threadedly receive a vertical reference or indicator element which is coupled to datum points on the vehicle body. Openings 60 extend into slides 41 for a depth sufficient to retain the vertical element during operation of the straightener of the invention. The structure and function of the vertical elements will be described in detail later.

The measuring bridge is supported on frame 6 by air pressure cylinder means 4 which when actuated from a source of pneumatic pressure coupled to inlet 80' of the bridge, raises the elements 150 of the bridge against the underside of the vehicle body with sufficient pressure to maintain the bridge in proper orientation and reference with the vehicle to ensure accurate measurement of the reforming operation. To maintain proper orientation during operation, it is advantageous to pressurize the front pair of air cylinders 6 from a constant pressure source annd the back pair of air cylinders from a variable pneumatic pressure source through fluid lines 4a and 4b coupled by suitable means to the respective pair of air cylinders. A pressure regulator (not shown) may control the pressure applied from both sources.

Figure 12:
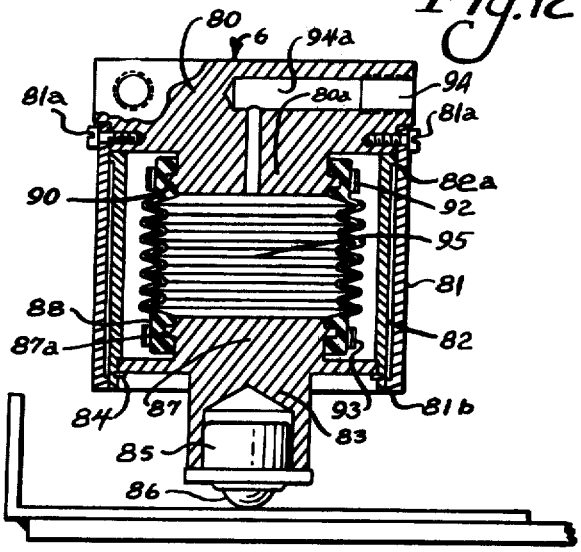
FIG. 12 is a sectional illustration of one of the air pressure cylinders supporting the measuring bridge relative to the vehicle in FIG. 1.

Referring now to FIG. 12, the details of one of the air pressure means 6 of the invention is shown. The air pressure means includes an upper closure member 80 having a lower hub 80a. An outer cylinder 81 is carried on upper closure 80 by means of a plurality of threaded elements 81a and the outer cylinder 81 includes a lip 81b at its bottom which contacts an inner concentric cylinder 82. The upper end of cylinder 82 also includes projecting lip 82a whereby contact between the inner and outer cylinders is created by lips 81b and 82a. A lower closure 83 seals the bottom of the cylinder 82 and is fixedly supported within the inner cylinder 82 by means of a ring element 84.

The bottom portion of the lower closure includes a bracket 85 receiving a ball 86 for rotary or rolling motion therein which permits the air cylinder to be movable in any direction relative to the base upon which it is situated. The upper portion of lower closure 83 includes an upwardly extending hub 87 having a side circumferential projection 87a receiving the bead or strip 88 of a suitable bellows element 89. The upper end of the bellows element is secured to hub 80a by another projection 90 supporting the upper bead or strip of the bellows.

The upper and lower strips of the bellows are retained in fluid tight relationship on the respective projections by means of metal straps 92 and 93 securing the bellows in place. A pressure line (not shown) coupling either lines 4a or 4b from inlets 80' to a respective inlet 94 of an air cylinder 6 introduces pressure into a respective air cylinder through inlet 94 which directs air through passage 94a into the bellows chamber 95. It should be apparent that upon pressurization of the bellows, upper closure 80 and outer cylinder 81 are capable of relative movement with respect to inner cylinder 82 and lower closure member 83. Thus, as pressure of a predetermined level is introduced into bellows 95, the upper closure 80 moves upwardly to bias against the underside of the measuring bridge at plates 14b to raise it to an appropriate vertical position in accordance with the objects of the invention.

Referring now to FIGS. 13 to 19, there is shown several embodiments of vertical elements which may be coupled to slide assemblies 20 heretofore described and to datum points on the vehicle body. Because a datum point might be represented by numerous structures and may be created by a hole in the vehicle frame, a bolt in the vehicle frame or other element and the datum point itself may be located in a plane which is not in parallel relationship to the plane of the measuring bridge, different problems of attachment and referencing arise.

Figure 14:
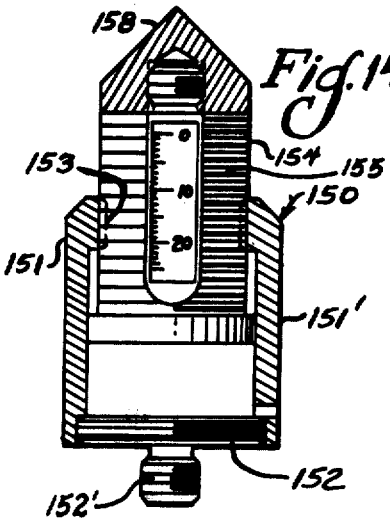
FIG. 14 is a side schematic illustration of a vertical reference slide for use with the measuring bridge of the invention.

Moreover, datum points on an undamaged portion of a vehicle each are located at a measurable position from a reference in a lateral, longitudinal and vertical direction, a position different for each vehicle model dependent on its symmetry along its center line. The physical three dimensional locations of these datum points can be tabulated for each vehicle model which tabulation may be referred to during use of the straightener of the invention. By attaching three or more reference vertical elements as shown in FIG. 14, each being of a predetermined height and being moved and retained at its proper lateral and longitudinal position on the bridge as provided by the tabulation, the measuring bridge is referenced when such reference vertical elements are coupled to such datum points on the vehicle.

The measuring vertical elements shown in FIGS. 13 and 15 to 19 are extensible along their length and movable on bridge 4 so that when attached to datum points on damaged portions they automatically indicate the deviation of respective points in three directions which can be corrected by the application of force to the vehicle.

Figure 13:
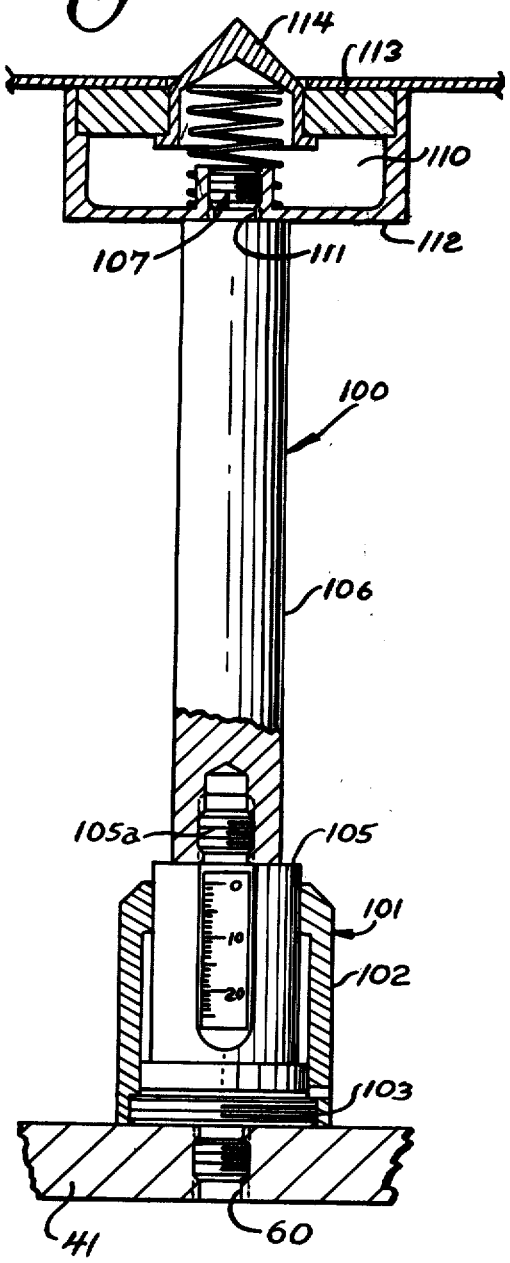
FIG. 13 is a side schematic illustration with parts broken away of one embodiment of a vertical measuring slide for use with the measuring bridge of the invention.

Referring to FIG. 13, there is illustrated one embodiment of a vertical indicating element of the invention which is designed to be attached to datum points in damaged areas of the vehicle. Vertical indicating system 100 shown in FIG. 13 forms a vertical element and comprises a plurality of components of fixed known heights whereby lower indicating slide assembly 101 is telescopically movable to compensate for, measure and vary as the datum point is returned to its proper vertical position. The sliding indicating assembly 101 comprises an outer cylinder 102 with a closure 103 at its bottom. The closure bottom 103 possesses a projection which may, for example, be threaded to be attached to a selective hole 60 provided on lateral slide 41 beneath damaged portions of a vehicle to be straightened.

The cylinder 102 receives a telescopically extensible piston 105. An indication of the height of assembly 101 and a measurement of the amount of movement of piston 105 is provided by a measuring scale attached to the piston. An elongated slot (not shown) may be provided through the wall of the cylinder 102 to permit viewing of the scale or the top of the cylinder may form a reference to exposed indicia. The upper portion of piston 105 includes a threaded projection 105a which may be attachable to a number of fixed reference extensions of any length dependent on the vehicle model and the location of the datum point. In FIG. 13 an extension 106 of a fixed known height is shown having a threaded projection 107 easily inserted into a datum point on a vehicle for coupling of element 100 thereto.

A threaded hole can be created at the datum for receipt of projection 107 by attaching a magnet assembly 110 of known height to the vehicle body having its own threaded opening 111. Magnet assembly 110 includes a housing 112 through which a lower threaded opening 111 is formed. An annular magnet 113 creates an upper surface of the assembly. A spring biased cone 114 extends through the magnet to be coupled with a datum hole on the vehicle. If no hole was present at the datum point, the cone might be omitted whereby the magnetic assembly creates a datum point. Depending on the location of the datum point, other elements of known dimensions may also be included or elements shown in FIG. 13 might be omitted.

Figure 15:
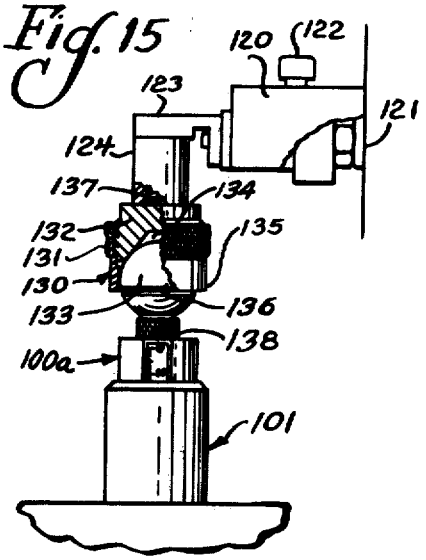
FIG. 15 is a side schematic illustration of a second embodiment of the vertical slide assembly for use with the measuring bridge of the invention.

Referring to FIG. 15, there is illustrated another embodiment of a vertical indicating system 100a forming a vertical element to be coupled to damaged portions of a vehicle. Again as described with reference to the embodiment of FIG. 13, the components forming the vertical elements are all of fixed lengths such that a building block type technique is utilized dependent on encountered conditions such as the vehicle model and the location of the datum point above the reference plane created by measuring bridge 5. The lower indicating assembly 101 shown in FIG. 15 is identical to that described with reference to FIG. 13 but components are shown in FIG. 15 adapted to be coupled to a vehicle bolt creating a datum point lying in a plane perpendicular to the plane of the measuring bridge.

A device 120 in the form of a chuck surrounds a nut 121 on the vehicle and has inner surfaces to embrace the nut and a threaded shaft 122 is tightened against nut 121 to retain the chuck thereon. The chuck includes an outward projection 123 having a threaded hole in which an extension 124 having a threaded projection may be inserted to couple the measuring element 100a on a lateral slide assembly 20 of the measuring bridge to the datum point formed by the vehicle bolt head.

In certain situations, the datum point may be positioned on twisted portions of the vehicle body or frame. It is important to ensure that the vertical element 100a is properly referenced with respect to the plane on which a datum point should be oriented. The maintanence of this symmetry is accomplished by an intermediate assembly 130 in form of a ball joint which permits free relative angular movement between the lower portion of the vertical element 100a and its upper portion. The joint 130 includes upper bracket 131 mounted on a base 132 by suitable means such as threads. Base 132 receives a ball 133 in a cavity 134 formed thereon whereby the lower edge 135 of bracket 131 retains the ball. A scored circumferential indicia 136 is positioned on the ball adjacent edge 135 whereby the entire indicia 136 may only be seen if an upper coupler 137 of the ball is aligned along the same axis as a lower threaded projection 138 formed on ball 133. Projection 138 is threadedly attached to the lower indicator assembly 101. Extension 124 includes a lower hole which is threadly attached to upper coupler 137.

Referring now to FIGS. 16, 17, 18 and 19 there is shown another embodiment of the vertical measuring element of the invention which is similar to the embodiments described with reference to FIGS. 13 and 15 but differs in that the datum point in the form of a hole or nut as shown in FIG. 16 lies in a plane which is not parallel or perpendicular to the reference plane. To provide for accurate results under these conditions where datum points are located in such planes in damaged portions of vehicles, a protractor 140 is situated between a ball joint assembly 130 and chuck 120 embracing a nut on a datum point in an angularly disposed plane. As best shown in FIG. 17, protractor 140 includes a main body 141 having calibrations from 0 to 90 degrees. Main body 141 possesses curved slot 142 in which pivotally mounted arm 145 having a pin 146 disposed in slot 142 may move to any angle. The arm then can be locked at any angle on the protractor by tightening threaded thumb screw 148 passing through the body 141 into the arm. The proper angle is determined by information compiled for a particular vehicle as to what angular disposition should the datum point selected lie. If the datum point is not on its proper angle selected on the protractor, then the deviation is indicated by the misalignment of indicia 136 of the ball joint 130. Correction of this deviation is made by the operator as forces are applied to the vehicle.

In the previously described three embodiments of vertical indicating elements, these represent but a few of the multitude of different fixtures which can form a vertical element of the invention to permit the measuring bridge to be utilized in countless different situations dictated by different damage conditions, vehicle models and other conditions. The fundamental function of the indicating vertical element is to couple a datum point to the slide assembly to measure deviation from proper symmetry whereby the slide assembly permits measured movement of the elements longitudinally and laterally in response to the same motion of the datum point during application of force. The indicating element is also capable of measured vertical extension as the datum point moves in a vertical direction until the vehicle is reformed.

Referring now to FIG. 14, there is shown a reference vertical assembly 151 which is utilized as part of a vertical reference element 150 to be attached from the measuring bridge to reference datum points in an undamaged portion of the vehicle. The vertical reference slide assembly 151 possesses a cylinder 151' having a bottom assembly in the form of a closure 152 with a lower threaded projection 152' attachable to a selected hole 60 in a lateral slide assembly. Cylinder 151' includes threaded upper opening 153 receiving a piston 154 having a threaded exterior 155. A primary difference between the reference slide assembly of FIG. 14 and the indicating assembly 101 shown in FIG. 13 is the threaded connection between the piston and cylinder of FIG. 14 whereby the piston may be rotated to create a reference height of the reference element which has been established for each datum point for a given model vehicle. The piston 154 may be calibrated along its side to indicate the overall length of the vertical reference slide and is rotated until a desired height is achieved.

Figure 9:
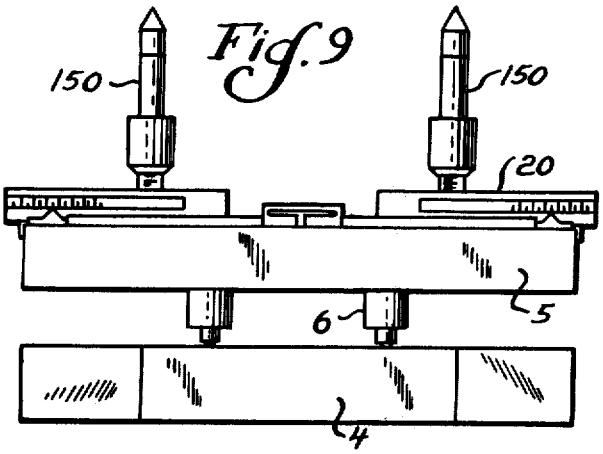
FIG. 9 is an end schematic illustration of the measuring bridge of the invention illustrated in FIG. 1.

Because of the threaded interconnection of the piston to the cylinder, once the vertical height is selected and/or preset by an operator, it does not extend during operation and creates a fixed reference height. The reference assembly 150 is used in conjunction with the selected fixed dimensions of the various other fixtures (not shown) similar as shown in conjunction with the embodiment described with reference to FIGS. 13, 15 and 16. However, it should be apparent that such other fixtures and components forming the reference element should be rigid to maintain proper orientation of the bridge. The function of the reference element 150 is to establish a fixed reference height determined from compilations of such data for each datum point on a portion of the vehicle which is undamaged. The use of a plurality of fixed reference elements with at least one on each side of the center line permits an operator to establish an accurate referencing of the measuring bridge with a vehicle. Then as a force is applied to the vehicle, datum points in damaged portions can be altered to reach target points dependent on the reference created by elements 150. Coupling is established between a datum and reference element 150 by means of an insertion of upper cone 158. It should be noted that in FIG. 9 a different form of a reference element 150 is shown in which the cylinder is disposed above the piston. Otherwise, the function and structure of the element 150 is similar to that shown in FIG. 14.

In operation of the straightener of invention, an operator selects three of more, optimumly, four datum points, in undamaged portions of the vehicle, preferably spaced as far apart as possible. The operator then selects one or more datum points in damaged portions of a vehicle, four such points has been convenient in use. Adaptors such as magnetic assembly 111 or chuck 120 can be attached to datum points to establish holes, if necessary. Then the compilation of data for proper dimensions of such points which is available for each vehicle model is consulted. According to this data a slide assembly for use in conjunction with a reference datum point in the undamaged area is set longitudinally and laterally using the linear scales on tracks 11 or 12 and slide assembly 20 and an appropriate hole 60 on slide 41. This procedure is repeated for all four reference datum points.

The proper lateral and longitudinal position for each reference datum point is then set on the measuring bridge by tightening threaded shafts 37 and 45 shown in FIGS. 5, 6 and 8 and restraining a respective slide 41 from lateral and longitudinal movement. The vertical reference assembly 151 is then attached to an appropriate hole 60 on the slide and fixed components of known height are locked on assembly 151 with an upper cone 158 to establish a vertical reference element 150 of fixed height according to the data set for each datum point. Measuring bridge 6 is raised by air pressure cylinders 5 until upper cones 158 of the four reference elements are inserted into respective datum holes in the vehicle or the adaptor attached to the datum point. The measuring bridge is then properly referenced to the vehicle for straightening operation. Vertical indicating elements 100 can be attached to respective slide assemblies 20 and coupled to the selected datum points in damaged portions. The straightening operation can then be performed in the manner described in the previously mentioned co-pending application, Ser. No. 680,146 now U.S. Pat. No. 4,055,061.

While preferred embodiments of the present invention have been illustrated and described, it will be understood by those skilled in the art that various changes and modifications may be made and equivalents may be substituted for elements hereof without departing from the true scope of the invention. In addition, many modifications may be made to adapt a particular situation or material to the teachings of the invention without departing from the central scope thereof. Therefore, it is intended that this invention not be limited to the particular embodiment disclosed as a best mode contemplated for carrying out this invention, but that the invention will include all embodiments falling within the scope of the appended claims.

What is claimed is:

1. A measuring bridge for use in an apparatus for straightening and reforming a vehicle for indicating and monitoring the magnitude of correction in the repair of the vehicle, said measuring bridge being supported on a surface below the vehicle and comprising:

a plurality of interconnected tracks, a plurality of independent support means movably mounted on said tracks for at least longitudinal and lateral movement, a plurality of reference elements mounted on said independent support means and engageable with datum points on undamaged portions of the vehicle to provide predetermined reference positioning of the measuring bridge with respect to the vehicle, a plurality of indicating elements mounted on said independent support means and [in coupling relationship with datum points on damaged and unaligned portions of the vehicle, said indicating elements responding to the application of corrective forces to provide a continuous] *providing an* indication of the [magnitude of] correction of the vehicle, and means disposed between the tracks and the supporting surface for positioning the tracks and elements mounted thereon relative the vehicle before and during repair thereof and the reference elements in engagement with the vehicle, said positioning means including roller means for permitting rolling movement between the tracks and the supporting surface.

2. The measuring bridge defined in claim 1, wherein the positioning means further includes means for resiliently biasing said tracks and elements mounted thereon toward said vehicle and said reference elements into engagement with the vehicle.

3. The resilient biasing means defined in claim 2, which includes a pneumatic cylinder.

4. A measuring bridge for use in an appliance for straightening and reforming a vehicle for indicating and monitoring the magnitude of correction in the repair of the vehicle, said measuring bridge being supported on a surface below the vehicle and comprising:

a frame, a plurality of independent support means movably mounted on said frame for at least longitudinal and lateral movement, a plurality of reference elements mounted on said independent support means and engageable with datum points on undamaged portions of the vehicle to provide predetermined reference positioning of the measuring bridge with respect to the vehicle, a plurality of indicating elements mounted on said independent support means and [in coupling relationship with datum points on damaged and unaligned portions of the vehicle, said indicating elements responding to the application of corrective forces to provide a continuous] *providing an* indication of the [magnitude of] correction of the vehicle, and means disposed between the frame and the supporting surface for positioning the frame and elements mounted thereon relative the vehicle before and during repair thereof, said positioning means including means for biasing said frame and elements mounted thereon toward the vehicle, whereby the reference elements are continually maintained in engagement with the vehicle, and roller means for permitting rolling movement between the frame and the supporting surface.

5. The measuring bridge defined in claim 4, wherein said biasing means includes a plurality of fluid cylinders.

*6. Measuring means for use in connection with the straightening and reforming of damaged vehicles and including a base portion,*

*a plurality of support means movably mounted on said base portion for longitudinal and transverse movement relative to said vehicle,*

*a plurality of upwardly extending elements mounted on said support means and movable therewith for being positioned below datum points on the underside of said vehicle,*

*pressure means resiliently supporting the base portion, said pressure means including a plurality of extensible support means resiliently engaging said base portion and being extensible for elevating said base portion toward said vehicle so that said elements are elevated into engagement with said datum points, said extensible means being constructed and arranged for biasing said elements in contact with said datum points as said vehicle is repaired.*

*7. The apparatus set forth in claim 6 wherein said pressure means includes a plurality of fluid operated extension members respectively supporting said base portion.*

*8. The apparatus set forth in claim 7 wherein said fluid operated extension members comprise pneumatically operated extension members.*

*9. The apparatus set forth in any of claim 6, 7 or 8 wherein said base includes a plurality of generally parallel rails, said support means comprising a plurality of carriage means mounted on said rails for respectively moving said elements horizontally and longitudinally beneath said vehicle, said extension means elevating said rails for resiliently urging said elements into engagement with said vehicle.*

*10. The apparatus set forth in claim 7, 8 or 9 wherein said fluid operated means includes a movable portion coupled to said base and a hollow expandable pressure means whereby when said pressure means is coupled to a source of fluid pressure said base portion is elevated toward said vehicle.*

*11. The apparatus set forth in claim 6, 7 or 8 and including roller means mounted on each of said extensible means to permit said base portion to be movably positioned beneath said vehicle.*

* * * * *